(12) United States Patent
Bodge et al.

(10) Patent No.: US 7,996,442 B2
(45) Date of Patent: Aug. 9, 2011

(54) METHOD AND SYSTEM FOR COMPARING AND RE-COMPARING DATA ITEM DEFINITIONS

(75) Inventors: Andrew Heath Bodge, Acton, MA (US); Harish Akali, Merrimack, NH (US); Luming Han, Bedford, NH (US); Xiaolan Shen, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 526 days.

(21) Appl. No.: 11/250,511

(22) Filed: Oct. 17, 2005

(65) Prior Publication Data

US 2007/0088733 A1  Apr. 19, 2007

(51) Int. Cl.
*G06F 17/30* (2006.01)
*G06F 7/00* (2006.01)
*G06F 17/00* (2006.01)
*G06F 17/20* (2006.01)
*G06F 9/44* (2006.01)
*G06F 9/45* (2006.01)

(52) U.S. Cl. ........ 707/806; 707/638; 707/695; 715/229; 717/122; 717/170

(58) Field of Classification Search .......... 715/530, 715/531, 205–208, 526, 229; 707/203, 102, 707/104.1, 806, 638, 695; 709/206; 717/122, 717/170

See application file for complete search history.

(56) References Cited

U.S. PATENT DOCUMENTS

| | | | | |
|---|---|---|---|---|
| 5,754,860 | A * | 5/1998 | McKeeman et al. | 717/124 |
| 6,106,571 | A * | 8/2000 | Maxwell | 717/131 |
| 6,986,132 | B1 * | 1/2006 | Schwabe | 717/168 |
| 7,281,018 | B1 * | 10/2007 | Begun et al. | 1/1 |
| 7,526,768 | B2 * | 4/2009 | Schleifer et al. | 719/310 |
| 7,555,752 | B2 * | 6/2009 | de Groot et al. | 717/170 |
| 7,613,780 | B2 * | 11/2009 | DeSalvo | 709/206 |
| 2003/0149941 | A1 * | 8/2003 | Tsao | 715/530 |
| 2004/0064486 | A1 * | 4/2004 | Braun et al. | 707/203 |
| 2004/0093564 | A1 * | 5/2004 | Kumhyr et al. | 715/526 |
| 2005/0193038 | A1 * | 9/2005 | Pearson et al. | 707/203 |
| 2006/0271606 | A1 * | 11/2006 | Tewksbary | 707/203 |
| 2007/0271300 | A1 * | 11/2007 | Ramaswamy | 707/104.1 |

* cited by examiner

*Primary Examiner* — Mohammad Ali
*Assistant Examiner* — Bao G Tran
(74) *Attorney, Agent, or Firm* — Murphy & King, P.C.

(57) ABSTRACT

A method, system, and computer program product provides the capability to compare data object definitions in a database in a less costly and less time-consuming manner than previous techniques. A method of comparing multiple versions of data item definitions in a database comprises generating a first version of comparison information relating to a plurality of data item definitions in the database by comparing information relating to data item definitions obtained from a first source and information relating to data item definitions obtained from a second source and generating a second version of comparison information relating to a plurality of data item definitions in the database by comparing information relating to data item definitions obtained from a first source and information relating to data item definitions obtained from a second source to the first version of comparison information.

30 Claims, 13 Drawing Sheets

Fig. 2a

| Type | Schema | Name | State | First_version | Last_version | (Differences) |
|---|---|---|---|---|---|---|
| TABLE | SCOTT | DEPT | L-O | 1 | 99999 | |
| TABLE | SCOTT | EMP | B-S | 1 | 99999 | |
| TABLE | SCOTT | LOC | B-D | 1 | 99999 | [...] |

| Type | Schema | Name | State | First_version | Last_version | (Diff.) |
|---|---|---|---|---|---|---|
| TABLE | SCOTT | DEPT | L-O | 1 | 99999 | |
| TABLE | SCOTT | EMP | B-S | 1 | 99999 | |
| TABLE | SCOTT | LOC | B-D | 1 | 99999 | [...] |
| TABLE | SCOTT | SALGRADE | R-O | 2 | 99999 | |

| Type | Schema | Name | State | First_version | Last_version | (Diff.) |
|---|---|---|---|---|---|---|
| TABLE | SCOTT | DEPT | L-O | 1 | 99999 | |
| TABLE | SCOTT | EMP | B-S | 1 | 2 | |
| TABLE | SCOTT | LOC | B-D | 1 | 99999 | [...] |
| TABLE | SCOTT | SALGRADE | R-O | 2 | 99999 | |
| TABLE | SCOTT | EMP | B-D | 3 | 99999 | [...] |

| Type | Schema | Name | State | First_version | Last_version | (Diff.) |
|---|---|---|---|---|---|---|
| TABLE | SCOTT | DEPT | L-O | 1 | 3 | |
| TABLE | SCOTT | EMP | B-S | 1 | 2 | |
| TABLE | SCOTT | LOC | B-D | 1 | 99999 | [...] |
| TABLE | SCOTT | SALGRADE | R-O | 2 | 99999 | |
| TABLE | SCOTT | EMP | B-D | 3 | 99999 | [...] |

260

METHOD AND SYSTEM FOR COMPARING AND RE-COMPARING DATA ITEM DEFINITIONS

BACKGROUND OF THE INVENTION

1. Field of the Invention

The present invention relates to a system, method, and computer program product for comparing multiple versions of data item definitions.

2. Description of the Related Art

A database management system (DBMS) provides the capability to store, organize, modify, and extract information from one or more databases included in the DBMS. From a technical standpoint, DBMSs can differ widely. The terms relational, network, flat, and hierarchical all refer to the way a DBMS organizes information internally. The internal organization can affect how quickly and flexibly you can extract information.

Each database included in a DBMS includes a collection of information and other objects organized in such a way that computer software can select and retrieve desired pieces of data. Traditional databases are organized by fields, records, and files. A field is a single piece of information; a record is one complete set of fields; and a file is a collection of records. Most full-scale database systems are relational database systems. An important feature of relational systems is that a single database can be spread across several tables. This differs from flat-file databases, in which each database is self-contained in a single table. In fact, large relational database systems may include a large number of tables and other data objects, such as indexes, etc. In order for a data object to exist in a database, the data object and its characteristics must be defined by a data object definition. Typically, such data object definitions are stored as metadata of the data objects. Taken together, all the data object definitions define the design of the database. Typically, the data objects are organized by schemas, each of which includes at least a portion of the data object definitions.

As the design of a database system changes over time, it is important to database developers and administrators to be able to track the changes in the data object definitions of the database. The task is to compare two specified sets of database metadata object definitions, storing the comparison results, then to repeat the process at later points in time using the same selection criteria. Conventionally, all metadata object definitions that met the selection criteria are compared and all results stored each time the process is repeated. This is a costly and time-consuming process. A need arises for a technique by which data object definitions may be compared and the results stored that reduces the cost and time of the process.

SUMMARY OF THE INVENTION

The present invention provides the capability to compare data object definitions in a database in a less costly and less time-consuming manner than previous techniques. Using the present invention, after an initial comparison of metadata definitions has been performed, the definitions are compared to the stored results of the comparison, rather than to each other.

In one embodiment of the present invention, a method of comparing multiple versions of data item definitions in a database comprises generating a first version of comparison information relating to a plurality of data item definitions in the database by comparing information relating to data item definitions obtained from a first source and information relating to data item definitions obtained from a second source and generating a second version of comparison information relating to a plurality of data item definitions in the database by comparing information relating to data item definitions obtained from a first source and information relating to data item definitions obtained from a second source to the first version of comparison information.

In one aspect of the present invention, both the first source and the second source may be dynamic and the second version may be generated by performing a three-way comparison among the information relating to data item definitions obtained from the first source, the information relating to data item definitions obtained from the second source, and the first version of comparison information. The information relating to data item definitions obtained from the first source and the information relating to data item definitions obtained from the second source may be ordered lists of data item definitions and associated delta values. The first source and the second source may be dynamic and the second version may be generated using a hash table structure including entries relating to the data item definitions. Each entry of information relating to a data item definition may include information relating to key characteristics of the data item, information relating to a comparison state of the data item, and information relating to delta values of the data item. The information relating to data item definitions obtained from the first source and the information relating to data item definitions obtained from the second source may be unordered lists of data item definitions and associated delta values.

In one aspect of the present invention, the first source may be static and the second source may be dynamic and the second version may be generated by performing a two-way comparison between the information relating to data item definitions obtained from the second source and the first version of comparison information. The information relating to data item definitions obtained from the first source and the information relating to data item definitions obtained from the second source are ordered lists of data item definitions and associated delta values.

In one aspect of the present invention, the first source is static and the second source is dynamic and the second version is generated using a hash table structure including entries relating to the data item definitions. Each entry of information relating to a data item definition may include information relating to key characteristics of the data item, information relating to a comparison state of the data item, and information relating to delta values of the data item. The information relating to data item definitions obtained from the first source and the information relating to data item definitions obtained from the second source may be unordered lists of data item definitions and associated delta values.

BRIEF DESCRIPTION OF THE DRAWINGS

Further features and advantages of the invention can be ascertained from the following detailed description that is provided in connection with the drawings described below:

FIG. 2a is an exemplary illustration of a comparison entry versions table.

FIG. 2b is an exemplary illustration of a comparison entry versions table.

FIG. 2c is an exemplary illustration of a comparison entry versions table.

FIG. 2d is an exemplary illustration of a comparison entry versions table.

DETAILED DESCRIPTION OF THE PREFERRED EMBODIMENTS

The present invention provides the capability to compare data object definitions in a database and store the results in a less costly and less time-consuming manner than previous techniques. Using the present invention, after an initial set of metadata definitions has been compared and the results stored, only those definitions that have changed since the last time the definitions were compared are again compared and stored. The present invention provides a way to store only changed comparison results, which allows efficient retrieval of the complete set of comparison results as they existed at each point of comparisons, and algorithms for efficiently determining which comparison results may have changed since the last point of comparison.

This present invention provides an efficient technique for comparing the definitions of two sets of data items and storing the results, then repeating the process later to create a new set of results, and so on. The technique provides advantages in both execution time and storage space over the obvious approach of comparing all the definitions and storing all the results, each time.

Figure 1:
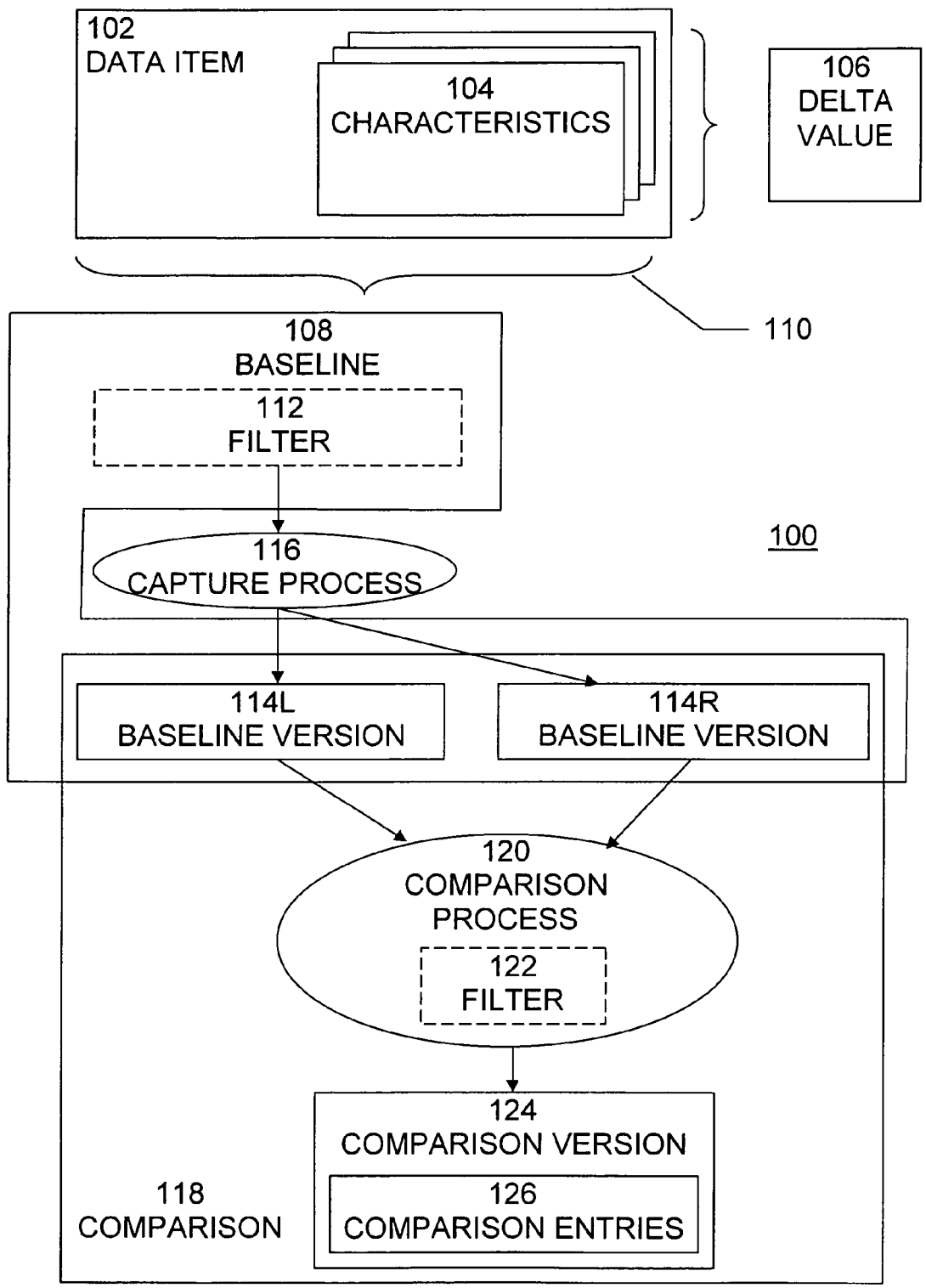
FIG. 1 is a block diagram of a system in which the present invention may be implemented.

An example of a system 100 in which the present invention may be implemented is shown in FIG. 1. In this example, the comparison of two baseline versions is shown. However, this is merely an example. It is also possbile to compare a database to a baseline version or to compare two databases. The present invention contemplates any and all such embodiments. System 100 includes one or more data items 102, characteristics 104, delta values 106, and baselines 108. A data item 102 is a collection of related information stored in a computer. The individual pieces of information are the data item's characteristics 104. These characteristics may change over time. Data items may be created and destroyed over time. For example, the definition of a metadata object such as a table or index is a data item. Its characteristics may include its name, owner, columns, constraints, and so on.

Key characteristics are a subset of a data item's characteristics that uniquely identify this data item among all others. For a given data item, the values of the key characteristics may not change during its lifetime. (If the value of a key characteristic does change, this is equivalent to destroying the data item and creating a new data item identified by the new key characteristic values.) It must be possible to efficiently and unambiguously sort a collection of data items based on their key values. For example, key characteristics may include a metadata object's type, owner, and name, such as TABLE SCOTT.TIGER or USER SCOTT.

A delta value 106 is a single, easily obtained value that is uniquely associated with a particular set of data item characteristic values. For a given data item, the delta value 106 is guaranteed to change each time one or more characteristic values changes. (If the set of characteristic values later returns to a previous configuration, the delta value 106 may or may not be the same as its previous value; the technique works in either case.) For example, a delta value 106 may be formed using a last-DDL timestamp indicating the last time that a metadata object's definition was modified, or a hash key calculated from the object's definition. A last-DDL timestamp distinguishes one version of a data item from other versions of the same data item that were modified at an earlier or later time. Other data items may have the same last-DDL timestamp. A hash key delta value, on the other hand, is uniquely associated with a single version of a single data item.

A baseline 108 is specification for capturing data items from a computer, including a source 110 of data items, such as a database, and a filter 112, which data item key values must pass in order to be included. For example, the filter 112 may specify inclusion of indexes and tables owned by user SCOTT. A baseline's source 110 and filter 112 may not be changed after the baseline 108 has been created. A baseline may also contain zero or more baseline versions 114 that have been captured using the specification. It is to be noted that the filter part 112 of the specification is optional (that is, not a necessary component of the technique). A baseline may capture all data items that are available from the source.

A baseline version 114L, 114R is a set of data items captured at a point in time. A baseline version 114L, 114R includes those data items that were present in the source, and that passed the filter, at the time of capture. A baseline version 114L, 114R preserves the characteristics of each data item as they existed at the time of capture. A baseline version 114L, 114R has a version number that distinguishes it from other versions of the same baseline. Once captured, a baseline version 114L, 114R may be deleted, but it may not be modified.

A data item version includes the values of a data item's characteristics at a particular point in time. A data item version may appear in one or more consecutive baseline versions; this indicates that the data item's characteristics have not changed during the time those baseline versions were captured.

Capture process 116 creates a baseline version 114L, 114R by determining which data items currently pass the filter 112, and storing the identities and characteristics of those data items.

A comparison 118 is a specification for comparing data items in a comparison process 120, including two sources of data items to compare (the "left" and "right" sources) and an optional filter 122 that data item key values from each source must pass in order to be included in the comparison. For example, a source may be either a database or a baseline version captured from a database, such as baseline versions 114L and 114R. Filter 122 is used by comparison process 120 to determine which data item key values from each source are to be included in the comparison. If no filter 122 is specified, all data items from both comparison sources are compared. A comparison also contains zero or more comparison versions 124 that have been created using the specification.

A comparison entry 126 is created for each data item that appears in either or in both comparison sources. The entry records information such as:
 a. The key characteristics of the data item
 b. The comparison state, which is one of:
   i. Present in left source only ("left-only")
   ii. Present in right source only ("right-only")
   iii. Present in both sources, and identical ("both-same")
   iv. Present in both sources, and different ("both-different")
   In this document, the term "both-xxx" is shorthand for "both-same or both-different."
 c. For objects that are present in both sources and different, a representation of the differences (optional in that the technique does not depend on it)
 d. Supplementary information needed to support the versioning and comparison techniques (described later)

A comparison version 124 is a set of comparison entries resulting from comparing two sets of data items.

Comparison process 102 creates a comparison version by determining which data items in each source pass the filter, determining the state (as described above) for each data item, and (if necessary) storing the identities and states of those data items.

A static comparison source is a comparison source in which the identities and characteristics of the data items cannot change. For example, a baseline version is a static comparison source. A dynamic comparison source is a comparison source in which the identities and characteristics of the data items can change. For example, a database is a dynamic comparison source.

In the prior art, each comparison version contains all the entries that result from comparing the two sources. In addition, when a data item is present in both sources, the definitions are always compared to determine if they are the same or different. It takes a great deal of time to compare all the definitions of matching data items, and a great deal of space to store the results. In the present invention advantage is taken of the likelihood that, from one comparison to the next, only a small percentage of the data items in each source will change, or be created or destroyed. Additionally, if a data source is a baseline version, its data items cannot change from one comparison version to the next. A variety of techniques are used to ensure that data item characteristics are compared only when one or both data items have actually changed, and only those comparison entries that are new or changed in the current comparison version are stored. This is invisible to the user. Each comparison version appears to be complete.

The key components of the technique are the following:
 A versioning scheme.
 A comparison algorithm. The comparison algorithm relies on delta values associated with the data items from the left and right sources and stored in the comparison entries. Using these values, the algorithm can determine if the data items in either source have changed since the data items were last compared, thus avoiding the need to compare data item characteristics in many cases.

The versioning scheme has two main components, storage, and operations. Regarding the storage component, each comparison entry is stored in one or more database tables. There is one table in particular (the "comparison entry versions table") that contains a single row for each comparison entry.

An example of such a table is shown in FIG. 2a. This table preferably contains at least the following columns:
 A column containing an identifier used to group all comparison entries that belong to a particular comparison.
 One or more columns that contain the compared data item's key characteristics values.
 One column that contains the comparison state of this comparison entry.
 Two columns, one for the left source and one for the right, that contain the delta values associated with the data item definitions in the left and right sources.
 A numeric column, FIRST_VERSION, which identifies the first comparison version in which a comparison entry version appears.
 A numeric column, LAST_VERSION, which identifies the last comparison version in which a comparison entry version appears. This column contains an arbitrarily high value (e.g., 99999) if the comparison entry version appears in the most recent comparison version.
 One or more additional columns may be used to store the comparison entry's differences information, or this information may be stored in other tables that are linked to the comparison entry versions table by some means. An example of a comparison entry versions table 200 after the initial comparison is shown in FIG. 2a. In this example, the comparison compares tables in schema SCOTT. In this example, table 200 includes columns such as type column 202, indicating the type of the object included in the comparison, schema column 204, indicating the schema of the object, name column 206, indicating the name of the object, comparison state column 207, indicating the comparison state (left-only, right-only, both-same, or both-different), first comparison version column 208, indicating the version number of the comparison in which the entry first appears, and last comparison version column 210, indicating the version number of the comparison in which the entry last appears. Table 200 is a comparison, so all entries present in the baseline at this point first appeared in comparison version 1.

In the example shown in FIG. 2b, table SALGRADE has been added to the schema SCOTT in the right source, and comparison version 2 is created. Table 220 includes the entries from table 200, plus the entry for table SALGRADE, which first appeared in comparison version 2.

In the example shown in FIG. 2c, table EMP has been modified in one source, and comparison version 3 is created as shown in Table 240. The original comparison entry for table EMP first appeared in comparison version 1 and last appeared in comparison version 2, while the new comparison entry for table EMP first appeared in comparison version 3.

In the example shown in FIG. 2d, table DEPT is dropped from the left source, and comparison version 4 is created as shown in Table 260. The comparison entry for table DEPT now has a last version of comparison version 3.

Regarding the operations component of the versioning scheme, how fundamental operations are carried out on the comparison entry versions table is described below.

Add a New Comparison Entry Version to a Comparison Version: While processing a new version n of comparison c, it is determined that a comparison entry with key characteristic values (k1=X, k2=Y) has been added since the last comparison version. Add a row to the comparison entry versions table with values:
 Comparison identifier column: comparison ID c
 Key characteristic columns: k1=X, k2=Y
 Comparison state as determined by the comparison process
 Delta value columns: delta values for this comparison entry version FIRST_VERSION: n
LAST_VERSION: 99999
Store the comparison entry's differences in additional comparison entry versions table columns or in other tables, as appropriate.

Remove a Comparison Entry Version from a Comparison Version: While processing a new version n of comparison version c, it is determined that a comparison entry with key characteristic values (k1=Q, k2=R) has been deleted since the last comparison version. Determine the number of the previous version (before n) pv. Find a row in the comparison entry versions table having values:
    Comparison identifier column: comparison ID c
    Key characteristic columns: k1=Q, k2=R
    LAST_VERSION: 99999
Update this row as follows:
    LAST_VERSION: pv Update a Comparison Entry Version in a Comparison Version: While processing a new version n of comparison version c, it is determined that a comparison entry with key characteristic values (k1=S, k2=T) has changed since the last comparison version. Carry out the "Remove a Comparison Entry Version" operation, followed by the "Add a Comparison Entry Version" operation, for data item (k1=S, k2=T).

Retrieve Comparison Entries that Constitute a Comparison Version: To retrieve all the comparison entries that constitute version n of comparison c, find the comparison entry versions table rows that meet the following criteria:
    Comparison identifier column: comparison ID c
    FIRST_VERSION: <=n
    LAST_VERSION: >=n Retrieve All Versions of a Comparison Entry: To retrieve all the versions from comparison c of a comparison entry with key characteristic values (k1=X, k2=Y), find the comparison entry versions table rows that meet the following criteria:
    Comparison identifier column: comparison ID c
    Key characteristic columns: k1=X, k2=Y The basic goal of the comparison processes for the present invention is to improve performance by avoiding detailed comparison of data item characteristics whenever possible. The fundamental principle behind this can be summarized as: if the previous comparison version contains a comparison entry involving data items from both sources, and neither data item has changed since the previous comparison version, then the result of comparing those data items cannot have changed. Therefore, it is not necessary to compare the data item characteristics in these cases.

The comparison processes rely on delta values for the data items involved in comparisons. These delta values are stored along with the comparison results to facilitate subsequent comparisons.

It is important to understand when delta values can be used to determine equality. There are two kinds of delta values used in the implementation: last-modification timestamps (these record the time at which the data item was created or last modified); and hash keys derived from the object's definition (for example, its creation DDL). Given that the data items come from different sources, delta values can be used as follows:

Hash key delta values can always be used to determine if two objects are identical or different. If the hash key values are equal, the objects are identical, regardless of their sources.

Last-modification timestamp delta values can be used to determine if two objects are identical only if the two sources were derived from a single source. The practical application of this rule is that last-modification values can be used when one source is a database and the other source is a baseline version captured from that database, or when both sources are baseline versions captured from the same database. In these cases, the sources are said to be timestamp-comparable.

For example, databases X and Y both contain table SCOTT.DEPT. Since they are from different databases, last-DDL timestamps cannot be used to determine if they are the same. However, if a baseline BL-X is captured from database X, then X and BL-X are timestamp-compatible, and the last-DDL timestamp can be used later to determine if the definition of SCOTT.EMP captured in BL-X is the same as the definition currently in X.

Figure 3:
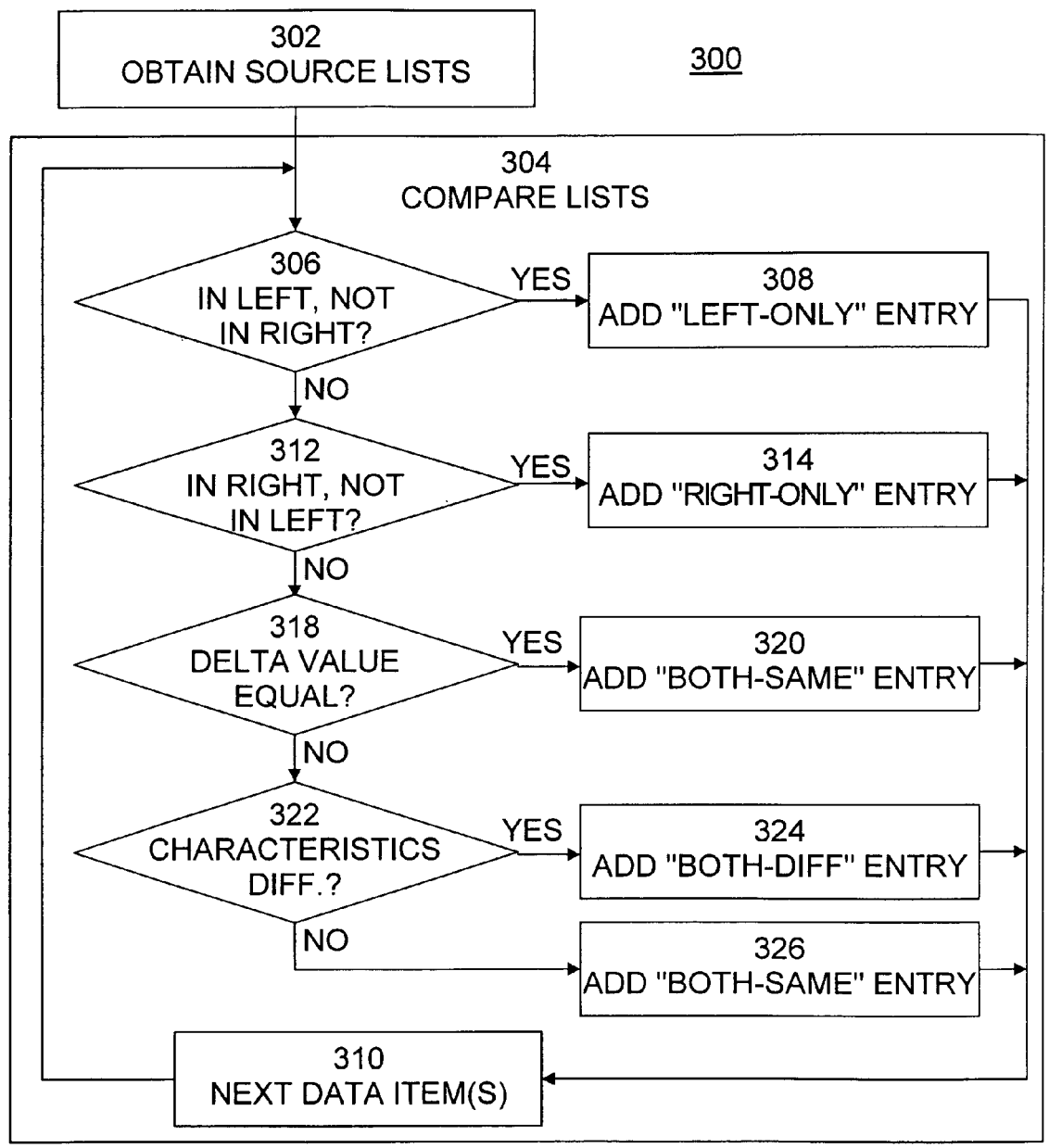
FIG. 3 is an exemplary flow diagram of a process of creation of a first comparison version.

An example of a process 300 of creation of version 1 (the first version) of comparison c is shown in FIG. 3. Process 300 begins with step 302, in which a list of data items is obtained from each source. The lists are ordered by key characteristics, including appropriate delta values for each data item. For timestamp-comparable sources, and data items of a type that have valid last-modification timestamps, last-modification delta values are obtained. For other data sources, hash key delta values are obtained. An efficient way to obtain this ordered list from a database is to create a temporary baseline of the database objects that match the comparison scope specification, then get an ordered list of the objects in the temporary baseline along with their hash-key delta values.

In step 304, the contents of the two lists are compared using a "lockstep" comparison process. In step 306, it is determined whether a data item is present in the left source list but not the right source list. If so, then the process continues with step 308, in which the "Add a New Comparison Entry to a Comparison Version" operation is used to add a comparison entry for the data item having a "left-only" state and including the delta value from the list as the left delta value for the comparison entry. The comparison entry is added to the comparison version. The process then continues with step 310, in which the left source list is advanced to the next data item and then loops back to step 306.

If the condition in step 306 is not met, then the process continues with step 312, in which it is determined whether a data item is present in the right source list but not the left source list. If so, then the process continues with step 314, in which the "Add a New Comparison Entry to a Comparison Version" operation is used to add a comparison entry for the data item have a "right-only" state and including the delta value from the list as the right delta value for the comparison entry. The comparison entry is added to the comparison version. The process then continues with step 310, in which the right source list is advanced to the next data item and then loops back to step 306.

If the condition in step 312 is not met, then the data item is present in both the left and right source lists. The process continues with step 318, in which it is determined whether the delta values associated with the left and right data items are equal. If the delta values associated with the left and right data items are equal, then the process continues with step 320, in which the "Add a New Comparison Entry to a Comparison Version" operation is used to add a comparison entry for the data item having a "both-same" state, and including the left and right delta values. The comparison entry is added to the comparison version. The process then continues with step 310, in which both the left and right source lists are advanced to the next data items, and then loops back to step 306.

If, in step 318, it is determined that the delta values associated with the left and right data items are not equal, then the process continues with step 322, in which the characteristics of the two data items are compared and it is determined whether or not they are different. If the characteristics are different, then the process continues with step 324, in which the "Add a New Comparison Entry to a Comparison Version" operation is used to add a comparison entry for the data item having a "both-different" state and including the left and right delta values and a representation of the differences. Alternatively, if in step 322, it is determined that the characteristics of the two data items are the same, then the process continues with step 326, in which the "Add a New Comparison Entry to a Comparison Version" operation is used to add a comparison entry for the data item having a "both-same" state and including the left and right delta values. In steps 324 and 326, the comparison entry is added to the comparison version. The process then continues with step 310, in which both the left and right source lists are advanced to the next data items, and then loops back to step 306.

It is to be noted that different delta values do not guarantee that data item characteristics are different. For example, last-modification values only show that the object has been modified. It may have been modified twice, returning to its original definition with the second modification. Likewise, a user may choose to ignore certain data item characteristics. If the remaining characteristics are the same, then the data items are to be considered identical even though some characteristics differ.

On the second and subsequent comparisons, the basic approach is to compare each source against the previous comparison version, including the stored delta values, rather than directly against the other source. Only when one or both of the data items have changed since the last comparison version is it necessary to compare the data-item characteristics.

A further optimization is possible when one of the sources is a baseline version. Since baseline versions cannot be modified, there is no possibility of the data items contained in the baseline version changing. The delta values associated with each baseline version data item are already stored in the comparison version, so it is not necessary to retrieve the contents of the baseline version in order to carry out the comparison. (As will be seen, it may be necessary to retrieve the stored characteristics of individual baseline version data items.) A baseline version is termed a static source: a source in which data items can change is termed a dynamic source.

Figure 4:
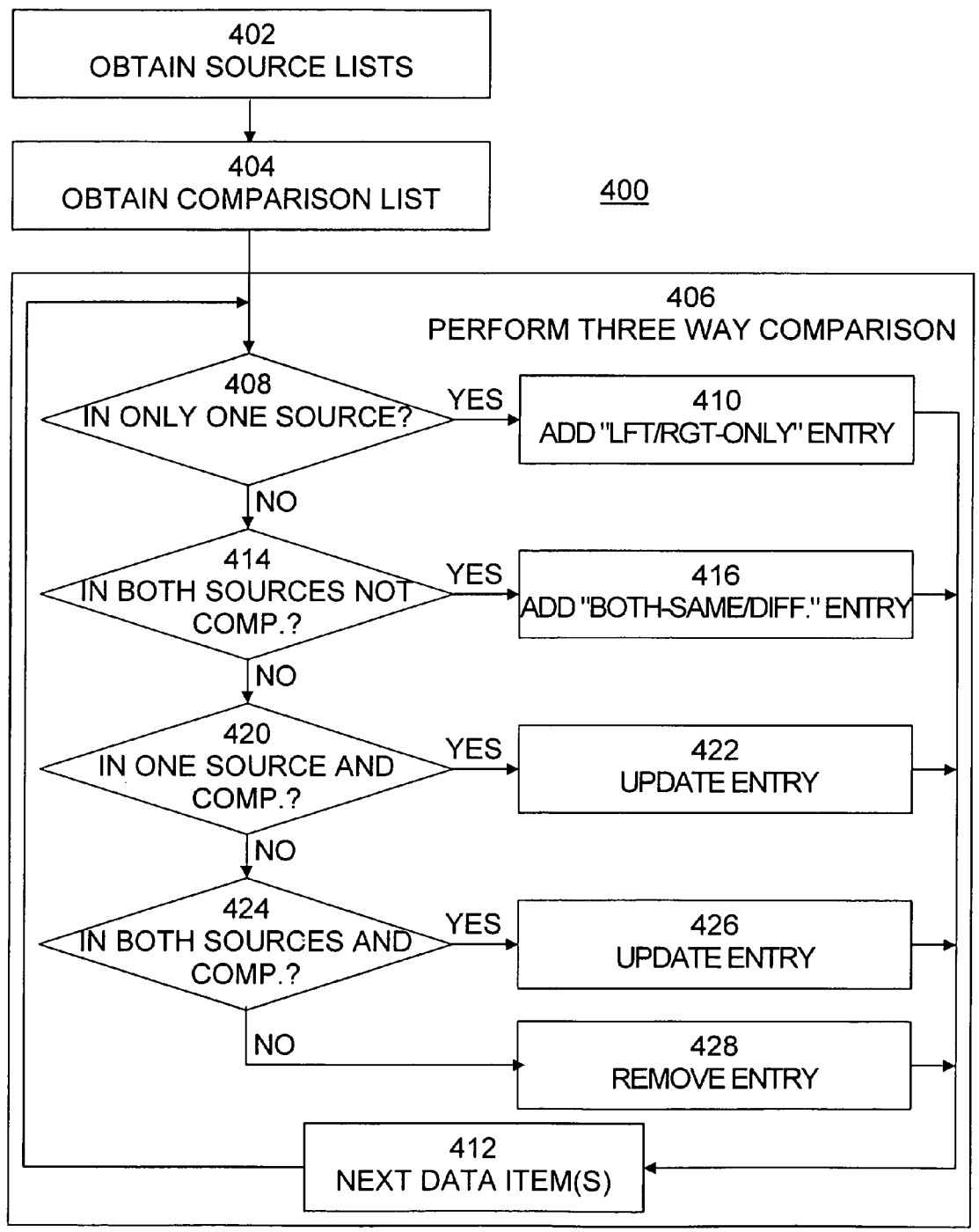
FIG. 4 is an exemplary flow diagram of a process of lock-step recomparison process where both sources are dynamic.

Depending on the type of data items being compared, either or both of two techniques may be used. For situations in which both sources are dynamic, a lockstep technique and/or a hash table technique may be used. An example of a process 400 of a lockstep recomparison process for use where both sources are dynamic is shown in FIG. 4. The lockstep technique is advantageously applied to types of data items that can efficiently be retrieved with their delta values in an ordered list from the source. Process 400 begins with step 402, in which two ordered lists of data items that meet the comparison scope specification from the left and right sources are obtained. (These are referred to as left-list and right-list.) Each entry in the list must contain at least the key characteristic values for the data item and the delta value associated with the data item.

In step 404 an ordered list of comparison entries from the previous comparison version is obtained. (This is referred to as comparison-list.) Each entry in this list must contain at least the key characteristic values for the data item, the comparison state from the previous comparison version, and the delta values associated with the left and/or right data items (for example, if the comparison state is left-only, the left delta value is present but not the right delta value).

In step 406, a three-way comparison is performed among the left-list, the right-list, and the comparison-list by advancing through each list and matching up data items where possible. There are several possible combinations handled by the steps within step 406. In step 408, it is determined whether the data item is in one source list, but not in the other source list or the comparison-list. If this is the case, the process continues with step 410, in which the "Add a New Comparison Entry to a Comparison Version" operation is used to add a new comparison entry having only a left-only or right-only state, depending on which source list (left or right) contains the data item. The process then continues with step 412, in which the appropriate list is advanced to the next data item and then loops back to step 408.

If the condition in step 408 is not met, then the process continues with step 414, in which it is determined whether the data item is in both source lists, but not in the comparison-list. If this is the case, then the process continues with step 416, in which the two data items are compared, first by comparing delta values (if applicable) to see if the data items are the same, otherwise comparing characteristics. Then the "Add a New Comparison Entry to a Comparison Version" operation is used to add a new comparison entry with state both-same or both-different, as appropriate, the delta values from left-list and right-list, and the difference information if appropriate. The process then continues with step 412, in which the source lists are advanced to the next data items and then loops back to step 408.

Figure 5:
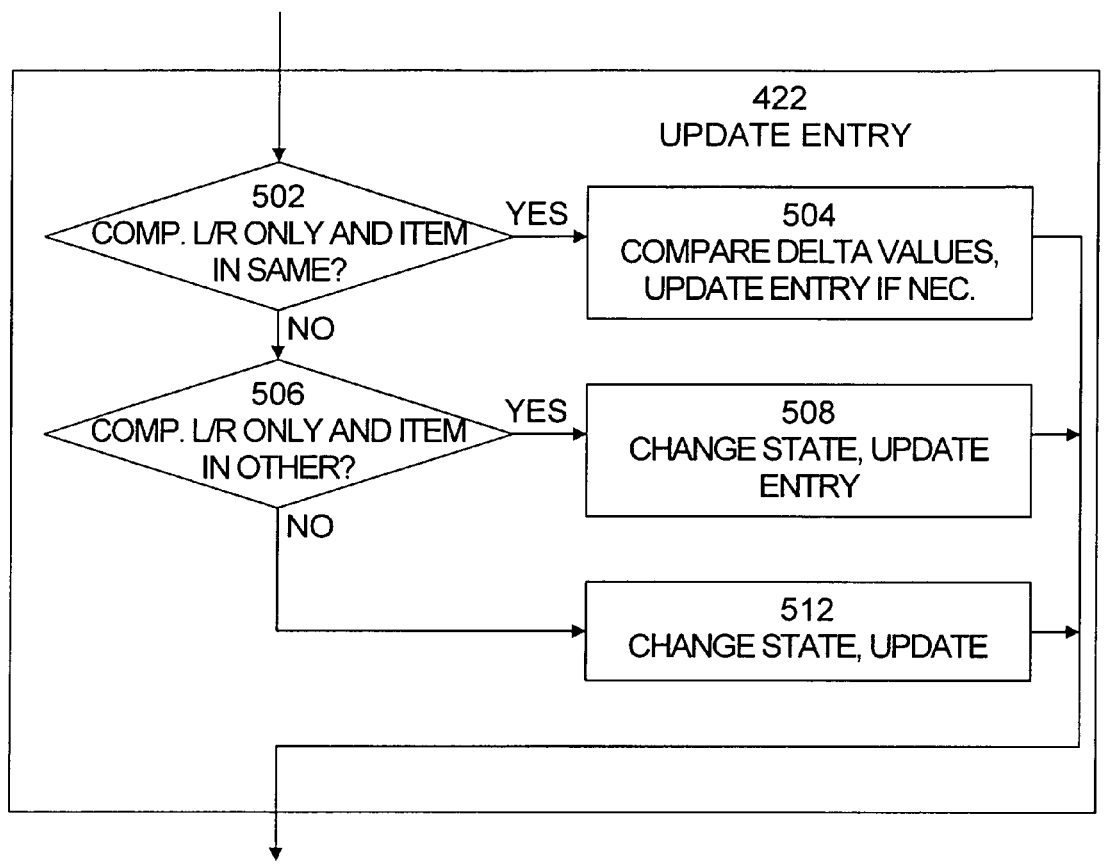
FIG. 5 is an exemplary flow diagram of a step shown in FIG. 4.

If the condition in step 414 is not met, then the process continues with step 420, in which it is determined whether the data item is in one source list, not the other source list, and in the comparison list. If this is the case, then the process continues with step 422, in which the comparison entry may be updated. Turning briefly to FIG. 5, a process for updating the comparison entry in step 422 is shown. The process of step 422 determines which source list contains the data item and the comparison state from the previous comparison. In step 502, it is determined whether the previous comparison state is left-only or right-only and the data item is present in the corresponding source list. If so, then the process continues with step 504, in which the delta values from the source list and the comparison list are compared. If they are different, the "Update a Comparison Entry in a Comparison Version" operation is used to update the comparison entry with the delta value from the source list. Otherwise, no change is needed.

If the condition in step 502 is not met, then the process continues with step 506, in which it is determined whether the previous comparison state is left-only or right-only and the data item is present in the other source list. If so, the process continues with step 508, in which the "Update a Comparison Entry in a Comparison Version" operation is used to update the state from left-only to right-only, or vice versa, as appropriate. The comparison entry is updated with the new state and the delta value from the source list.

If the condition in step 506 is not met, then the previous comparison state is both-xxx. The process continues with step 512, in which the "Update a Comparison Entry in a Comparison Version" operation is used to update the comparison entry with state left-only or right-only as appropriate and the delta value from the source list.

Returning now to FIG. 4, after step 422 is performed, the process then continues with step 412, in which the appropriate list(s) are advanced to the next data item(s) and then loops back to step 408.

Figure 6:
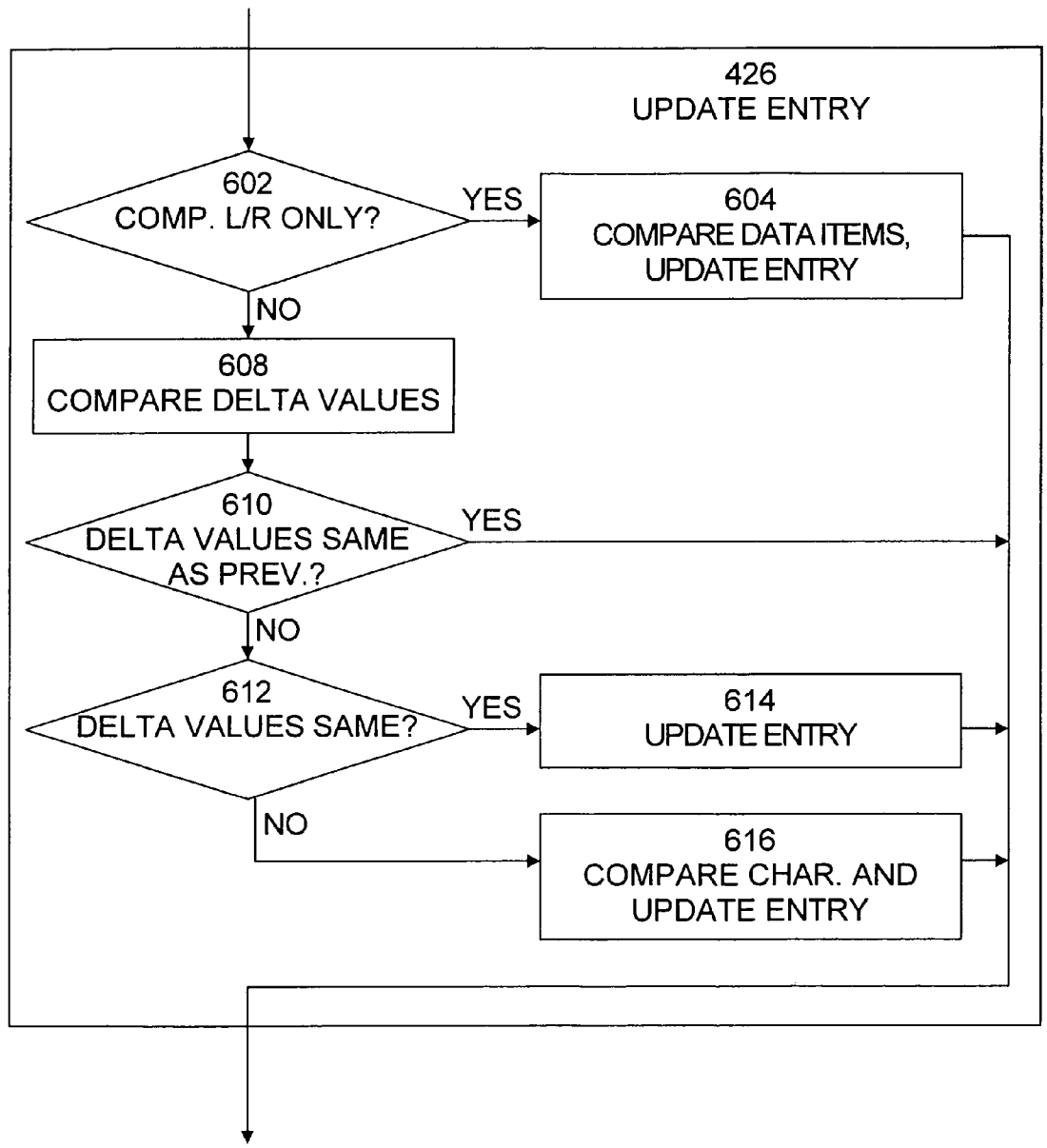
FIG. 6 is an exemplary flow diagram of a step shown in FIG. 4.

If the condition in step 420 is not met, then the process continues with step 424, in which it is determined whether the data item is in both source lists and the comparison list. If this is the case, then the process continues with step 426, in which the comparison entry may be updated depending on the comparison state from the previous comparison. Turning briefly to FIG. 6, the steps of a process for performing step 426 is shown. In step 602, it is determined whether the previous comparison state is left-only or right-only. If so, the two data items are compared, first comparing delta values (if applicable) to see if the data items are the same, otherwise comparing characteristics. Then, the "Update a Comparison Entry in a Comparison Version" operation is used to update the comparison entry with state both-same or both-different, as appropriate, the delta values from left-list and right-list, and the difference information if appropriate.

If the condition in step 602 is not met, the previous comparison state is both-xxx. The process continues with step 608, in which the stored left and right delta values are compared to the corresponding delta values from left-list and right-list. In step 610, it is determined whether both delta values are equal to their previous values. If so, no change has taken place in either data item and no action is required. Otherwise, the process continues with step 612, in which the delta values from left-list and right-list are compared to each other. If they are the same, then the process continues with step 614, in which the "Update a Comparison Entry in a Comparison Version" operation is used to update the comparison entry with the state both-same and the delta values from left-list and right-list. If they are different, then the process continues with step 616, in which the data item characteristics are compared, then the "Update a Comparison Entry in a Comparison Version" operation is used to update the comparison entry with state both-same or both-different, as appropriate, the delta values from left-list and right-list, and the difference information if appropriate.

Returning now to FIG. 4, after step 426 is performed, the process then continues with step 412, in which the appropriate list(s) are advanced to the next data item(s) and then loops back to step 408.

If the condition in step 424 is not met, the data item is in the previous comparison but not in either storage list. The process continues with step 428, in which the "Remove a Comparison Entry From a Comparison Version" operation is used to remove the comparison entry from the comparison version.

Figure 7:
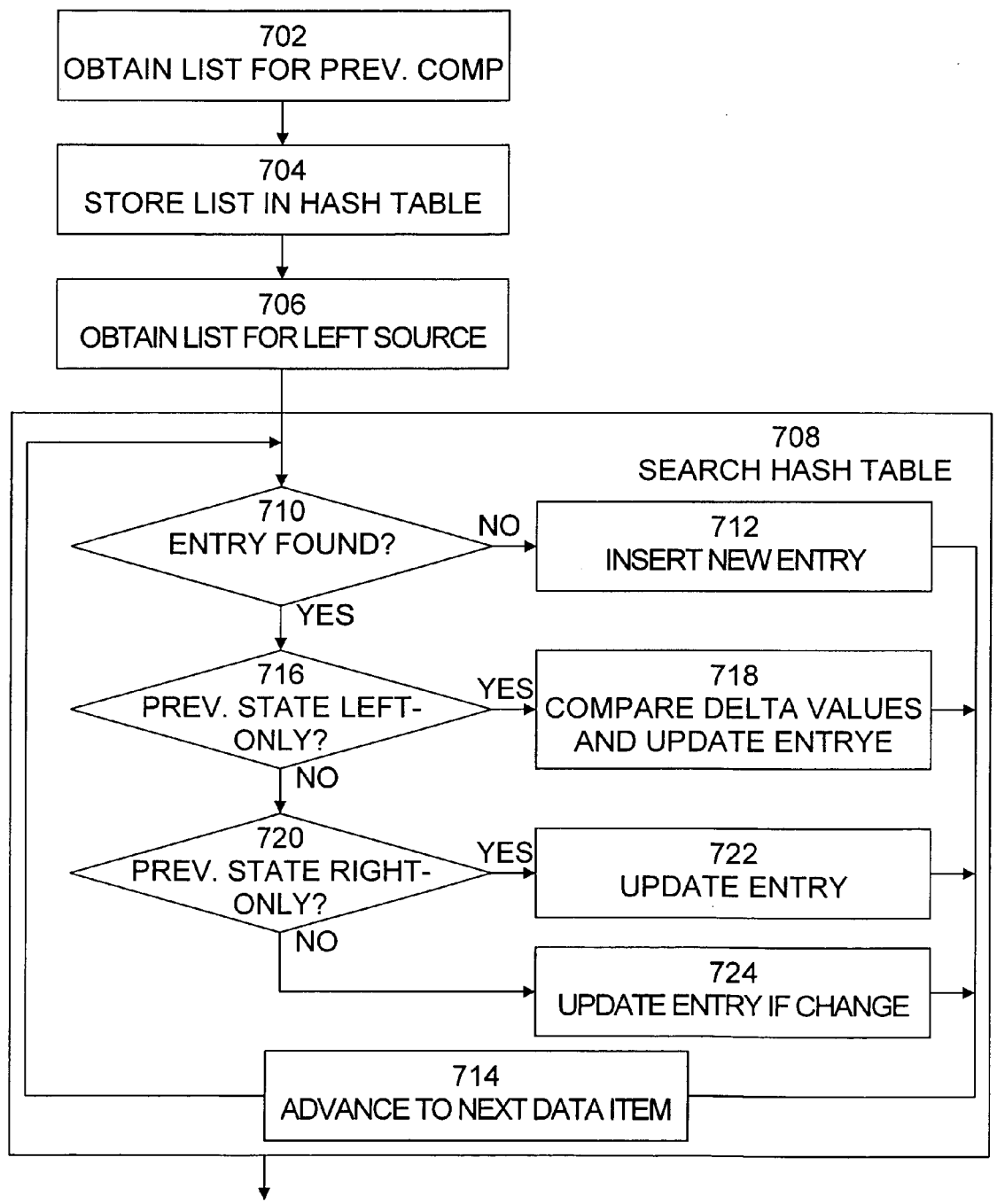
FIG. 7 is an exemplary flow diagram of a hash table recomparison process using an unordered list where both sources are dynamic.

An example of a process 700 of a hash table recomparison process for use where both sources are dynamic and contain data item types that cannot be efficiently retrieved from the source in an ordered list, but can be efficiently retrieved in an unordered list is shown in FIG. 7. Process 700 begins with step 702, in which a list of comparison entries from the previous comparison is obtained. Each entry must contain at least the key characteristics of the data item, the comparison state, and the left and/or right delta values stored in the comparison entry.

In step 704, the contents of the list are stored in an in-memory data structure (such as a hash table) that permits efficient access to data via a key. Preferably, the key includes a composite of the data item's key characteristics, such that the composite uniquely identifies the data item. Likewise, the data structure includes information such as the comparison state, the left delta value (if state is left-only or both-xxx), the right delta value (if state is right-only or both-xxx), and a flag indicating whether the data in the structure has been modified (the modified-flag, initially false).

In step 706, a list of data item key characteristics and associated delta values is obtained from the left source. In step 708, for each entry in this list, the key characteristics are used to search the hash table structure to find the corresponding entry in the hash table structure (if it exists). In step 710, it is determined whether the entry is found in the hash table structure. If the entry is not found in the hash table structure, the process continues with step 712, in which a new entry is inserted in the hash table structure. The new entry includes values such as a key, which is a composite of the data item's key characteristics, a comparison state value of left-only, and the left delta value from the left source. The right delta value is not set and the modified-flag is set to true. The process then continues with step 714, in which the process advances the left source list to the next data item, then loops back to repeat step 710 for the next data item.

If, in step 710, the entry is found in the hash table structure, then the process continues with steps 716-724, in which the data structure is modified, depending on the comparison state from the previous comparison. In step 716, it is determined whether the previous state is left-only. If so, then the process continues with step 718, in which the left delta value from the previous comparison is compared to the delta value from the left source list. If they are different, the modified-flag is set to true and the delta value in the data structure is updated to the value from the left source list. The process then continues with step 714, in which the process advances the left source list to the next data item, then loops back to repeat step 710 for the next data item.

If the condition in step 716 is not met, then the process continues with step 720, in which it is determined whether the previous state is right-only. If so, then the process continues with step 722, in which the data structure comparison state is set to both-different, the left delta value is set to the delta value from the left source list, and modified-flag is set to true. The process then continues with step 714, in which the process advances the left source list to the next data item, then loops back to repeat step 710 for the next data item.

If the condition in step 720 is not met, then the previous state is both-xxx. The process continues with step 724, in which the delta value from the left source list is compared to the left delta value from the previous comparison. If they are the same, no changes are made in the data structure (nothing has changed on the left side of the comparison). If they are different, the comparison state is set to both-different, the left delta value is set to the delta value from the left source list, and the modified-flag is set to true. The process then continues with step 714, in which the process advances the left source list to the next data item, then loops back to repeat step 710 for the next data item.

Figure 8:
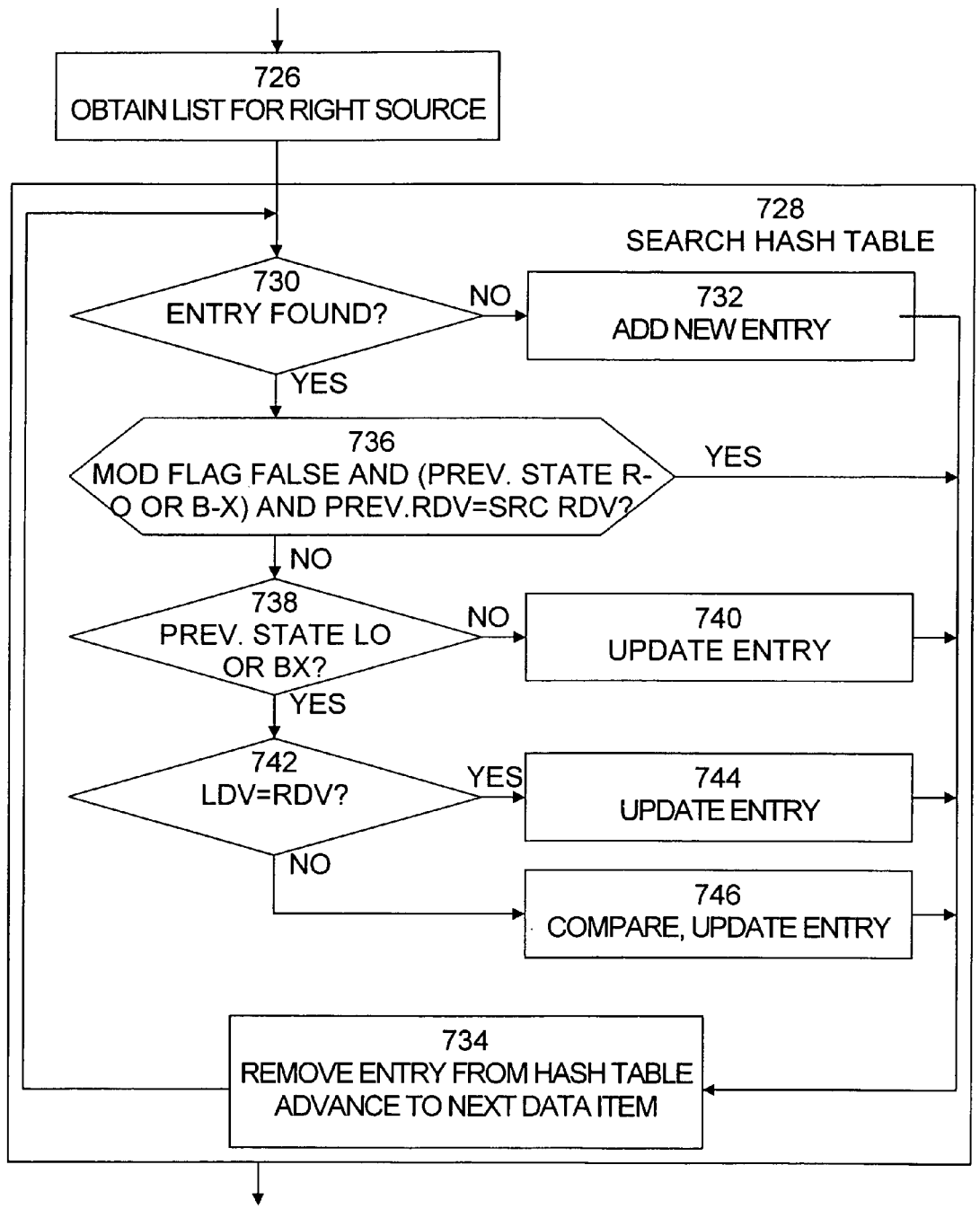
FIG. 8 is an exemplary flow diagram of a hash table recomparison process using an unordered list where both sources are dynamic.

Upon the completion of step 708 for all data items in the left source list, the process continues to step 726, shown in FIG. 8. In step 726, a list of data items and associated delta values is obtained from the right source. In step 728, for each entry in this list, the hash table is searched using the key characteristics to find the corresponding entry (if it exists) in the hash table structure. In step 730, it is determined whether the entry is found in the hash table structure. If the entry is not found in the hash table structure, then the process continues with step 732, in which the "Add a New Comparison Entry to a Comparison Version" operation is used to add a new comparison entry to the comparison, with a state of right-only, and with the delta value from the right source list. The process then continues with step 734, in which the entry is removed from the hash table structure and the process advances the right source list to the next data item, then loops back to repeat step 730 for the next data item.

If, in step 730, the entry is found in the hash table structure, then, in step 736, it is determined whether the modified-flag is false. If the modified-flag is false, the previous comparison state is both-xxx or right-only, and the right delta value from the data structure equals the delta value from the right source list, no action is taken. (Nothing has changed in either data item.) The process then continues with step 734, in which the entry is removed from the hash table structure and the process advances the right source list to the next data item, then loops back to repeat step 730 for the next data item.

If, in step 736, it is determined that the required conditions are not met, then the process continues with step 738, in which it is determined whether the previous comparison state is left-only or both-xxx. If the previous comparison state is not left-only or both-xxx, but rather is right-only, then the process continues with step 740, in which the "Update a Comparison Entry in a Comparison Version" operation is used to update the comparison entry with state right-only and the right delta value from right source list. The process then continues with step 734, in which the entry is removed from the hash table structure and the process advances the right source list to the next data item, then loops back to repeat step 730 for the next data item.

If, in step 738, the previous comparison state is left-only or both-xxx, then the process continues with step 742, in which the left delta value from the data structure is compared to the delta value from the right source list. If they are the same, then the process continues with step 744, in which the "Update a Comparison Entry in a Comparison Version" operation is used to update the comparison entry with state both-same, the left delta value from the data structure and the right delta value from the right source list. The process then continues with step 734, in which the entry is removed from the hash table structure and the process advances the right source list to the next data item, then loops back to repeat step 730 for the next data item.

If, in step 742, the left delta value from the data structure and the delta value from the right source list are different, then the process continues with step 746, in which the data item characteristics are compared and the "Update a Comparison Entry in a Comparison Version" operation is used to update the comparison entry with state both-same or both-different, as appropriate, with the left delta value from the data structure and the right delta value from right source list, and the difference information if appropriate.

Figure 9:
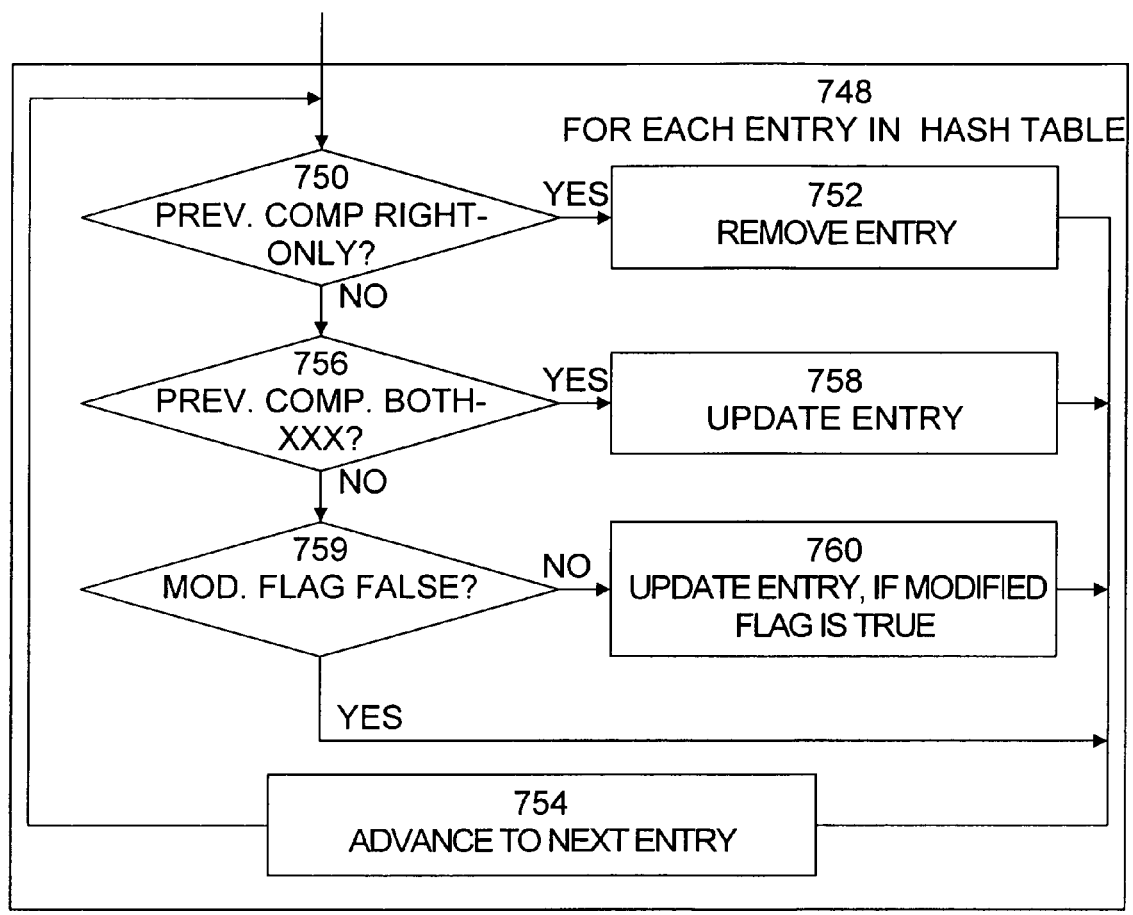
FIG. 9 is an exemplary flow diagram of a hash table recomparison process using an unordered list where both sources are dynamic.

Upon the completion of step 728 for all data items in the night source list, the process continues to step 748, shown in FIG. 9. In step 748, for each entry remaining in the hash table structure, the process performs step 750, in which it is determined whether the previous comparison state is right-only. If so, then the process continues with step 752, in which the "Remove a Comparison Entry From a Comparison Version" operation is used to remove the corresponding previous comparison entry from the current comparison. (The data item is no longer in the right source.) The process then continues with step 754, in which the process advances the next hash table entry, then loops back to repeat step 750 for the next entry.

If, in step 750, it is determined that the previous comparison state is right-only, then the process continues with step 756, in which it is determined whether the previous comparison state is both-xxx. If so, then the process continues with step 758, in which the "Update a Comparison Entry in a Comparison Version" operation is used to update the corresponding comparison entry with state left-only and the left delta value from the data structure stored in the hash table structure. The process then continues with step 754, in which the process advances the next hash table entry, then loops back to repeat step 750 for the next entry.

If, in step 756, it is determined that the previous comparison state is not both-xxx, then the previous comparison state is left-only and the process continues with step 759, in which it is determined if the modified-flag is false. If the modified-flag is true (indicating that the data item changed or was added since the last comparison), the process continues with step 760, in which the "Update a Comparison Entry in a Comparison Version" operation is used to update the corresponding comparison entry with state left-only and the left delta value from the data structure stored in the hash table structure. (Otherwise, no action is needed.) The process then continues with step 754, in which the process advances the next hash table entry, then loops back to repeat step 750 for the next entry.

Figure 10:
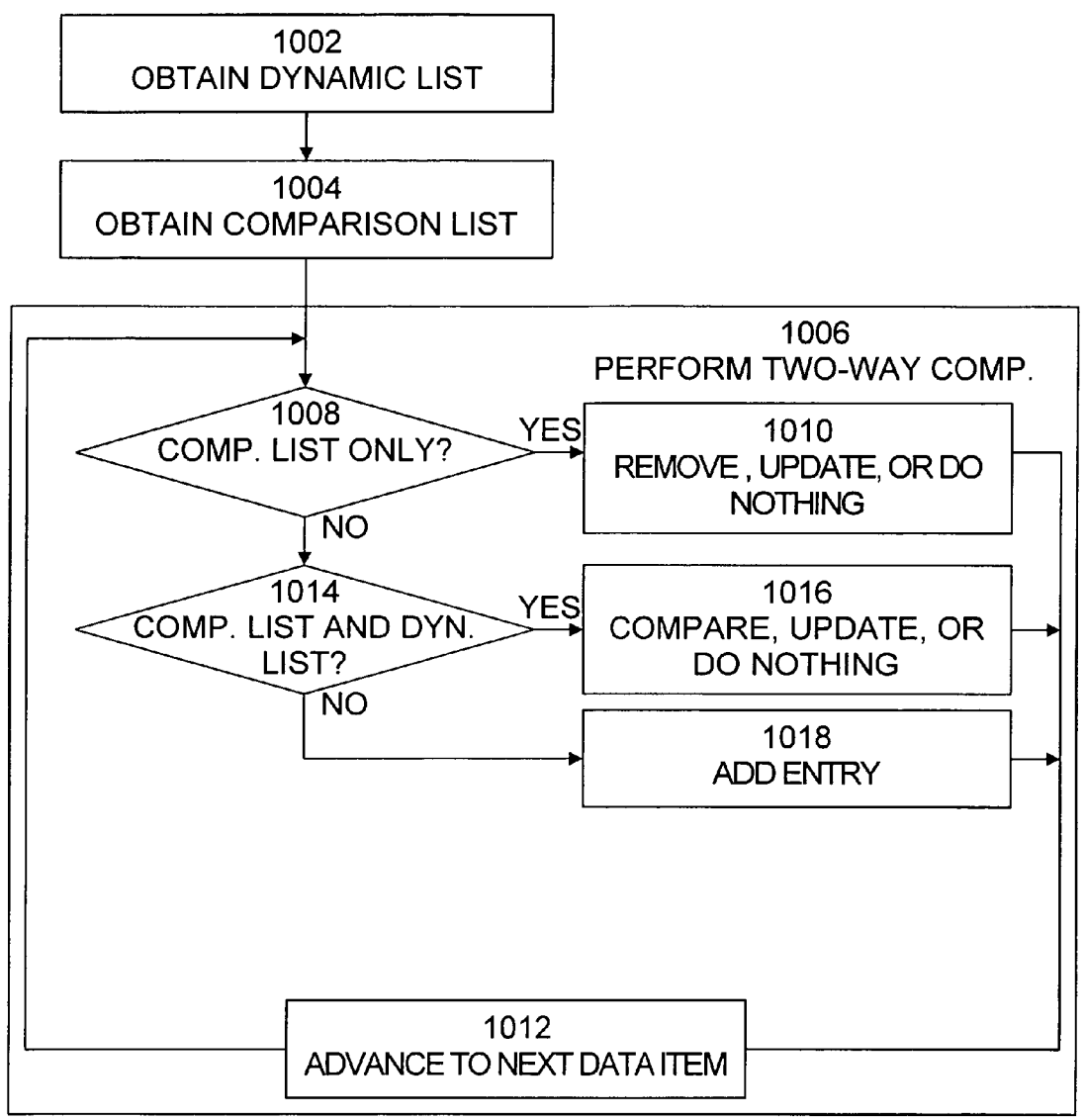
FIG. 10 is an exemplary flow diagram a process of lockstep recomparison process where one source is static.

When one source is static (i.e., a baseline version), streamlined versions of the above processes are used to take advantage of the fact that the data items in the static source cannot change. In the processes below, the term static-only is used to refer to the state of a data item that is present only in the static source, and dynamic-only refers to the state of a data item that is present only in the dynamic source. These terms are used instead of left-only and right-only in descriptions of the processing that follow. An example of a process 1000 of a lock-step process that may be used for types of data items that can efficiently be retrieved with their delta values in an ordered list from the source is shown in FIG. 10. Process 1000 begins with step 1002, in which an ordered list of data items that meet the comparison scope specification is obtained from the dynamic source. (This is referred to as the dynamic-list.) Each entry in the list contains at least the key characteristic values for the data item and the delta value associated with the data item.

In step 1004, an ordered list of comparison entries from the previous comparison version is obtained. (This is referred to as the comparison-list.) Each entry in this list contains at least the key characteristic values for the data item, the comparison state from the previous comparison version, and the delta values associated with the left and/or right data items (for example, if the comparison state is left-only, the left delta value is present but not the right delta value).

In step 1006, a two-way comparison is performed between the comparison-list and the dynamic-list, advancing through the two lists in lockstep fashion and processing each data item. In step 1008, it is determined whether the data item is in the comparison-list only. If so, then the process continues with step 1010, in which:

if the previous comparison state is dynamic-only, the "Remove a Comparison Entry From a Comparison Version" operation is used to remove the comparison entry from the current comparison;

if the previous comparison state is both-xxx, the "Update a Comparison Entry in a Comparison Version" operation is used to update the corresponding comparison entry with state static-only and the static-side delta value from the previous comparison result; and if the previous comparison state is static-only, no action is required.

The process then continues with step 1012, in which the process advances the comparison-list to the next entry, then loops back to repeat step 1008 for the next entry.

If, in step 1008, it is determined that the data item is not in the comparison-list only, then the process continues with step 1014, in which it is determined whether the data item is in both the comparison-list and the dynamic-list. If so, then the process continues with step 1016, in which:

If the previous comparison state is dynamic-only, no action is required. (It is pointless to update the delta value stored in the comparison, since there is never a need to compare that value to a value from the other side of the comparison.)

If the previous comparison state is both-xxx, the dynamic-side delta value from the previous comparison is compared to the delta value from the dynamic-list.
If they are equal, no action is required.
If they are not equal, the dynamic-side delta value is compared to the static-side delta value.
If they are equal, the "Update a Comparison Entry in a Comparison Version" operation is used to update the comparison entry with state both-same, the static-side delta value from the previous comparison, and the dynamic-side delta value from the dynamic-list.
If they are not equal, the two data items are compared. The "Update a Comparison Entry in a Comparison Version" operation is used to update the comparison entry with state both-same or both-different, as appropriate, the static-side delta value from the previous comparison, the dynamic-side delta value from the dynamic-list, and the difference information if appropriate.
If the previous comparison state is static-only, the dynamic-side delta value is compared to the static-side delta value.
If they are equal, the "Update a Comparison Entry in a Comparison Version" operation is used to update the comparison entry with state both-same, the static-side delta value from the previous comparison, and the dynamic-side delta value from the dynamic-list.
If they are not equal, the two data items are compared. The "Update a Comparison Entry in a Comparison Version" operation is used to update the comparison entry with state both-same or both-different, as appropriate, the static-side delta value from the previous comparison, the dynamic-side delta value from the dynamic-list, and the difference information if appropriate.

The process then continues with step 1012, in which the process advances the comparison-list to the next entry, then loops back to repeat step 1008 for the next entry.

If, in step 1008, it is determined that the data item is not in both the comparison-list and the dynamic-list, then the data item is in the dynamic-list only. The process continues with step 1018, in which the "Add a New Comparison Entry to a Comparison Version" operation is used to add a new comparison entry with state dynamic-only and the dynamic-side delta value from the dynamic list.

The process then continues with step 1012, in which the process advances the comparison-list to the next entry, then loops back to repeat step 1008 for the next entry.

Figure 11:
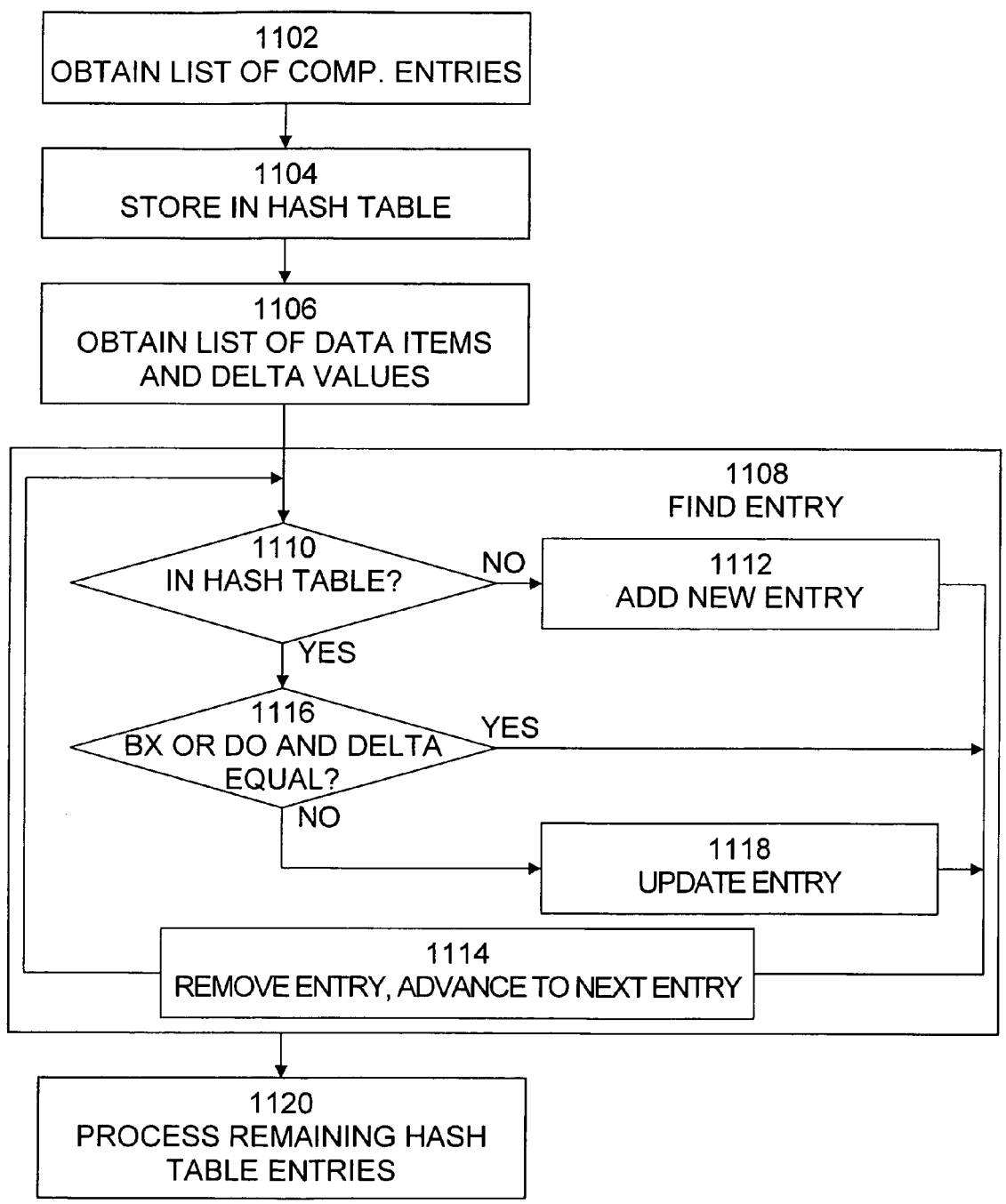
FIG. 11 is an exemplary flow diagram of a hash table recomparison process using an unordered list where one source is static.

For data item types that cannot be efficiently retrieved from the source in an ordered list, but can be efficiently retrieved in an unordered list, a hash table approach is used. An example of a hash table process 1100 is shown in FIG. 11. Process 1100 begins with step 1102, in which a list of comparison entries is obtained from the previous comparison. Each entry contains at least the key characteristics of the data item, the comparison state, and the left and/or right delta values stored in the comparison entry.

In step 1104, the contents of the list obtained in step 1102 are stored in an in-memory data structure (such as a hash table) that permits efficient access to data via a key. The key includes a composite of the data item's key characteristics, such that the composite uniquely identifies the data item. The data consists of a data structure containing at least the comparison state, the left delta value (if state is left-only or both-xxx), and the right delta value (if state is right-only or both-xxx).

In step 1106, a list of data items and associated delta values is obtained from the dynamic source. In step 1108, for each entry in this list, the key characteristics are used to find the corresponding entry (if it exists) in the hash table structure. In step 1110, it is determined whether the entry is found in the hash table structure. If the entry is not found in the hash table structure, then the process continues with step 1112, in which the "Add a New Comparison Entry to a Comparison Version" operation is used to add a new comparison entry to the comparison, state dynamic-only, with the delta value from the dynamic-list. The process continues with step 1114, in which the entry is removed from the hash table structure and the process advances to the next entry in the list and loops back to step 1110.

If, in step 1110, the entry is found in the hash table structure, then the process continues with step 1116, in which it is determined whether the previous comparison state is both-xxx or dynamic-only and the dynamic-side delta value from the data structure equals the delta value from the dynamic-list. If so, then no action is taken. The process continues with step 1114, in which the process advances to the next entry and loops back to step 1110. Otherwise, the process continues with step 1118, in which the "Update a Comparison Entry in a Comparison Version" operation is used to update the comparison entry as follows:
If the previous comparison state is static-only or both-xxx, compare the static-side delta value from the data structure to the delta value from the dynamic-list.
If they are the same, update the comparison entry with state both-same, the static-side delta value from the data structure and the dynamic-side delta value from the dynamic-list.
If they are different, compare the data item characteristics, then update the comparison entry with state both-same or both-different, as appropriate, the static-side delta value from the data structure and the dynamic-side delta value from the dynamic-list, and the difference information if appropriate.
If the previous comparison state is dynamic-only, no action is required. (It is pointless to update the delta value stored in the comparison, since there is never a need to compare that value to a value from the other side of the comparison.)

The process continues with step 1114, in which entry is then removed from the hash table structure and the process advances to the next entry in the list and loops back to step 1110.

When all entries in the list have been processed, the process continues with step 1120, in which, for each entry remaining in the hash table structure:
If the previous comparison state is dynamic-only, the "Remove a Comparison Entry From a Comparison Version" operation is used to remove the corresponding previous comparison entry from the current comparison.
If the previous comparison state is both-xxx, the "Update a Comparison Entry in a Comparison Version" operation is used to update the corresponding comparison entry with state static-only and the static-side delta value from the data structure stored in the hash table structure.
Otherwise, the comparison state is static-only. No action is required.

If both sources are static, do not carry out any comparison activity, since nothing in either source can change.

Figure 12:
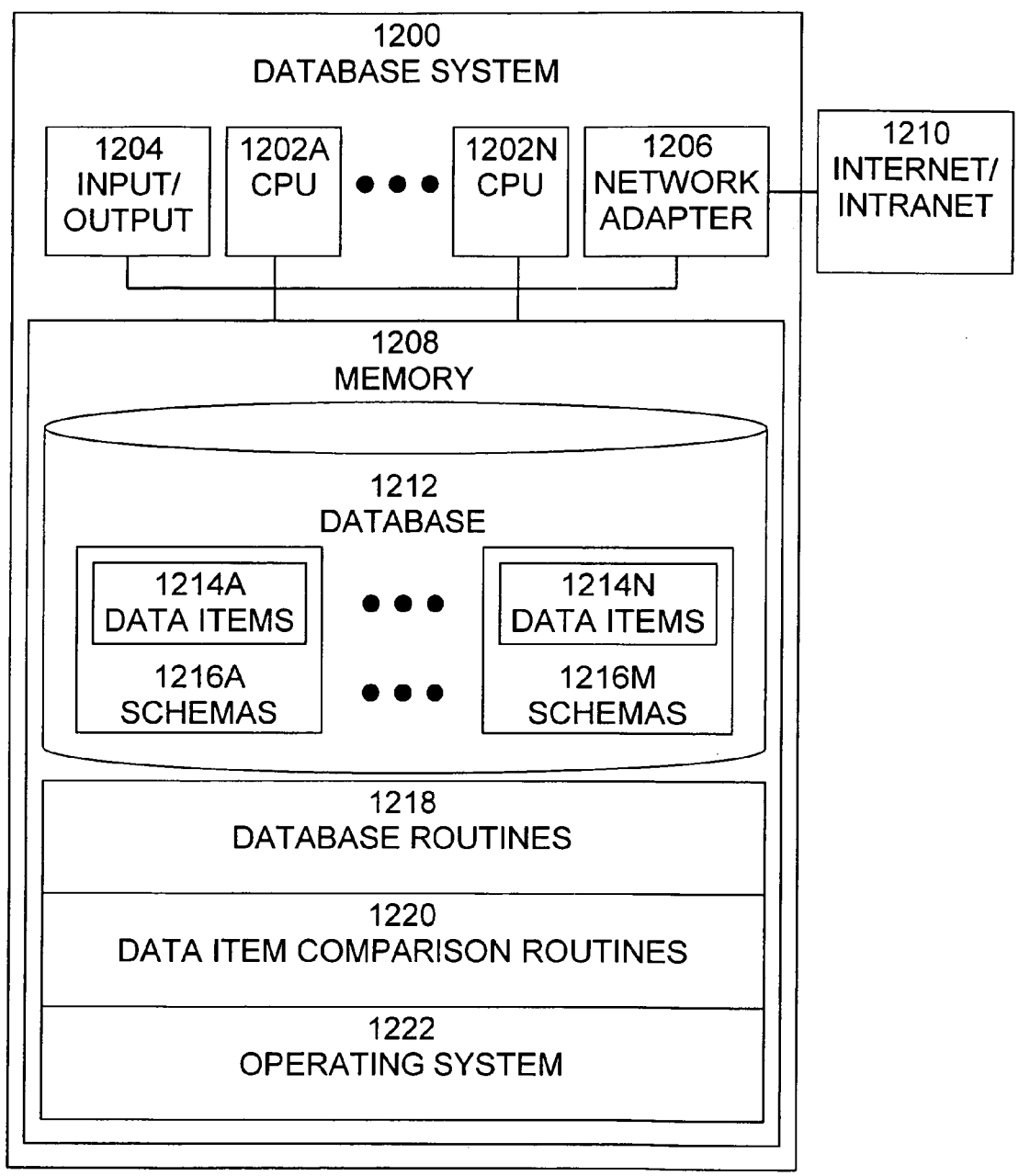
FIG. 12 is an exemplary block diagram of a database system, in which the present invention may be implemented.

An exemplary block diagram of a database system 1200, in which the present invention may be implemented, is shown in FIG. 12. System 1200 is typically a programmed general-purpose computer system, such as a personal computer, workstation, server system, and minicomputer or mainframe computer. System 1200 includes one or more processors (CPUs) 1202A-1202N, input/output circuitry 1204, network adapter 1206, and memory 1208. CPUs 1202A-1202N execute program instructions in order to carry out the functions of the present invention. Typically, CPUs 1202A-1202N are one or more microprocessors, such as an INTEL PENTIUM® processor. FIG. 12 illustrates an embodiment in which system 1200 is implemented as a single multi-processor computer system, in which multiple processors 1202A-1202N share system resources, such as memory 1208, input/output circuitry 1204, and network adapter 1206. However, the present invention also contemplates embodiments in which system 1200 is implemented as a plurality of networked computer systems, which may be single-processor computer systems, multi-processor computer systems, or a mix thereof.

Input/output circuitry 1204 provides the capability to input data to, or output data from, database system 1200. For example, input/output circuitry may include input devices, such as keyboards, mice, touchpads, trackballs, scanners, etc., output devices, such as video adapters, monitors, printers, etc., and input/output devices, such as, modems, etc. Network adapter 1206 interfaces database system 1200 with Internet/intranet 1210. Internet/intranet 1210 may include one or more standard local area network (LAN) or wide area network (WAN), such as Ethernet, Token Ring, the Internet, or a private or proprietary LAN/WAN.

Memory 1208 stores program instructions that are executed by, and data that are used and processed by, CPU 1202 to perform the functions of system 1200. Memory 1208 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 1208 vary depending upon the function that system 1200 is programmed to perform. In the example shown in FIG. 12, memory 1208 includes database 1212, database routines 1218, data item capture routines 1220, and operating system 1228. Database 1212 includes a collection of information and other objects organized in such a way that computer software can select and retrieve desired pieces of data. Database routines 1218 are software routines that provide the capability to store, organize, modify, and extract information from database 1212. Database 1212 includes a plurality of data items 1214A-N, which may be organized in one or more schemas 1216A-M. Data item comparison routines 1220 are software routines that provide the capability to compare and recompare data item versions. Operating system 1228 provides overall system functionality.

As shown in FIG. 12, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type and storage media such as floppy disc, a hard disk drive, RAM, and CDROM's, communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of comparing multiple versions of data item definitions in a database comprising:
   generating a first version of comparison information relating to a plurality of data item definitions in the database by comparing information relating to data item definitions obtained from a first source and information relating to data item definitions obtained from a second source; and
   generating a second version of comparison information relating to a plurality of data item definitions in the database by comparing information relating to data item definitions obtained from a first source to the first version of comparison information and information relating to data item definitions obtained from a second source to the first version of comparison information;
   wherein each comparison comprises comparing data item definitions only when at least one data item has changed from the first version of comparison information, and storing only each comparison entry that results from new or changed data item definitions from the first source, the second source, or both, and
   wherein each comparison entry comprises a comparison state indicating, for each data item that is compared, whether the data item is present only in the first source, the data item is present only in the second source, the data item is present in both sources and is identical, or the data item is present in both sources and is different and wherein both the first source and the second source are dynamic and the second version is generated by performing a three-way comparison among the information relating to data item definitions obtained from the first source, the information relating to data item definitions obtained from the second source, and the first version of comparison information.

2. The method of claim 1, wherein the information relating to data item definitions obtained from the first source and the information relating to data item definitions obtained from the second source are ordered lists of data item definitions and associated delta values.

3. The method of claim 1, wherein both the first source and the second source are dynamic and the second version is generated using a hash table structure including entries relating to the data item definitions.

4. The method of claim 3, wherein each entry of information relating to a data item definition includes information relating to key characteristics of the data item, information relating to a comparison state of the data item, and information relating to delta values of the data item.

5. The method of claim 4, wherein the information relating to data item definitions obtained from the first source and the information relating to data item definitions obtained from the second source are unordered lists of data item definitions and associated delta values.

6. The method of claim 1, wherein the first source is static and the second source is dynamic and the second version is generated by performing a two-way comparison between the information relating to data item definitions obtained from the second source and the first version of comparison information.

7. The method of claim 6, wherein the information relating to data item definitions obtained from the first source and the information relating to data item definitions obtained from the second source are ordered lists of data item definitions and associated delta values.

8. The method of claim 1, wherein the first source is static and the second source is dynamic and the second version is generated using a hash table structure including entries relating to the data item definitions.

9. The method of claim 8, wherein each entry of information relating to a data item definition includes information relating to key characteristics of the data item, information relating to a comparison state of the data item, and information relating to delta values of the data item.

10. The method of claim 9, wherein the information relating to data item definitions obtained from the first source and the information relating to data item definitions obtained from the second source are unordered lists of data item definitions and associated delta values.

11. A database system for comparing multiple versions of data item definitions comprising:

a processor operable to execute computer program instructions;

a memory operable to store computer program instructions executable by the processor, and computer program instructions stored in the memory and executable to perform the steps of:

generating a first version of comparison information relating to a plurality of data item definitions in the database by comparing information relating to data item definitions obtained from a first source and information relating to data item definitions obtained from a second source; and generating a second version of comparison information relating to a plurality of data item definitions in the database by comparing information relating to data item definitions obtained from a first source to the first version of comparison information and information relating to data item definitions obtained from a second source to the first version of comparison information;

wherein each comparison comprises comparing data item definitions only when at least one data item has changed from the first version of comparison information, and storing only each comparison entry that results from new or changed data item definitions from the first source, the second source, or both, and wherein each comparison entry comprises a comparison state indicating, for each data item that is compared, whether the data item is present only in the first source, the data item is present only in the second source, the data item is present in both sources and is identical, or the data item is present in both sources and is different and wherein both the first source and the second source are dynamic and the second version is generated by performing a three-way comparison among the information relating to data item definitions obtained from the first source, the information relating to data item definitions obtained from the second source, and the first version of comparison information.

12. The system of claim 11, wherein the information relating to data item definitions obtained from the first source and the information relating to data item definitions obtained from the second source are ordered lists of data item definitions and associated delta values.

13. The system of claim 11, wherein both the first source and the second source are dynamic and the second version is generated using a hash table structure including entries relating to the data item definitions.

14. The system of claim 13, wherein each entry of information relating to a data item definition includes information relating to key characteristics of the data item, information relating to a comparison state of the data item, and information relating to delta values of the data item.

15. The system of claim 14, wherein the information relating to data item definitions obtained from the first source and the information relating to data item definitions obtained from the second source are unordered lists of data item definitions and associated delta values.

16. The system of claim 11, wherein the first source is static and the second source is dynamic and the second version is generated by performing a two-way comparison between the information relating to data item definitions obtained from the second source and the first version of comparison information.

17. The system of claim 16, wherein the information relating to data item definitions obtained from the first source and the information relating to data item definitions obtained from the second source are ordered lists of data item definitions and associated delta values.

18. The system of claim 11, wherein the first source is static and the second source is dynamic and the second version is generated using a hash table structure including entries relating to the data item definitions.

19. The system of claim 18, wherein each entry of information relating to a data item definition includes information relating to key characteristics of the data item, information relating to a comparison state of the data item, and information relating to delta values of the data item.

20. The system of claim 19, wherein the information relating to data item definitions obtained from the first source and the information relating to data item definitions obtained from the second source are unordered lists of data item definitions and associated delta values.

21. A computer program product for comparing multiple versions of data item definitions in a database, the computer program product comprising:
   a computer readable storage medium;
   computer program instructions, recorded on the computer readable medium, executable by a processor, for performing the steps of generating a first version of comparison information relating to a plurality of data item definitions in the database by comparing information relating to data item definitions obtained from a first source and information relating to data item definitions obtained from a second source; and
   generating a second version of comparison information relating to a plurality of data item definitions in the database by comparing information relating to data item definitions obtained from a first source to the first version of comparison information and information relating to data item definitions obtained from a second source to the first version of comparison information;
   wherein each comparison comprises comparing data item definitions only when at least one data item has changed from the first version of comparison information, and storing only each comparison entry that results from new or changed data item definitions the first source, the second source, or both, and
   wherein each comparison entry comprises a comparison state indicating, for each data item that is compared, whether the data item is present only in the first source, the data item is present only in the second source, the data item is present in both sources and is identical, or the data item is present in both sources and is different and
   wherein both the first source and the second source are dynamic and the second version is generated by performing a three-way comparison among the information relating to data item definitions obtained from the first source, the information relating to data item definitions obtained from the second source, and the first version of comparison information.

22. The computer program product of claim 21, wherein the information relating to data item definitions obtained from the first source and the information relating to data item definitions obtained from the second source are ordered lists of data item definitions and associated delta values.

23. The computer program product of claim 21, wherein both the first source and the second source are dynamic and the second version is generated using a hash table structure including entries relating to the data item definitions.

24. The computer program product of claim 23, wherein each entry of information relating to a data item definition includes information relating to key characteristics of the data item, information relating to a comparison state of the data item, and information relating to delta values of the data item.

25. The computer program product of claim 24, wherein the information relating to data item definitions obtained from the first source and the information relating to data item definitions obtained from the second source are unordered lists of data item definitions and associated delta values.

26. The computer program product of claim 21, wherein the first source is static and the second source is dynamic and the second version is generated by performing a two-way comparison between the information relating to data item definitions obtained from the second source and the first version of comparison information.

27. The computer program product of claim 26, wherein the information relating to data item definitions obtained from the first source and the information relating to data item definitions obtained from the second source are ordered lists of data item definitions and associated delta values.

28. The computer program product of claim 21, wherein the first source is static and the second source is dynamic and the second version is generated using a hash table structure including entries relating to the data item definitions.

29. The computer program product of claim 28, wherein each entry of information relating to a data item definition includes information relating to key characteristics of the data item, information relating to a comparison state of the data item, and information relating to delta values of the data item.

30. The computer program product of claim 29, wherein the information relating to data item definitions obtained from the first source and the information relating to data item definitions obtained from the second source are unordered lists of data item definitions and associated delta values.

* * * * *

UNITED STATES PATENT AND TRADEMARK OFFICE
CERTIFICATE OF CORRECTION

PATENT NO. : 7,996,442 B2  Page 1 of 1
APPLICATION NO. : 11/250511
DATED : August 9, 2011
INVENTOR(S) : Bodge et al.

It is certified that error appears in the above-identified patent and that said Letters Patent is hereby corrected as shown below:

In column 3, line 54, delete "possbile" and insert -- possible --, therefor.

In column 13, line 43, delete "night" and insert -- right --, therefor.

In column 18, line 33-34, delete "CDROM's, communications links." and insert -- CDROM's. --, therefor.

Signed and Sealed this
Fifteenth Day of November, 2011

David J. Kappos
*Director of the United States Patent and Trademark Office*